UNITED STATES PATENT OFFICE.

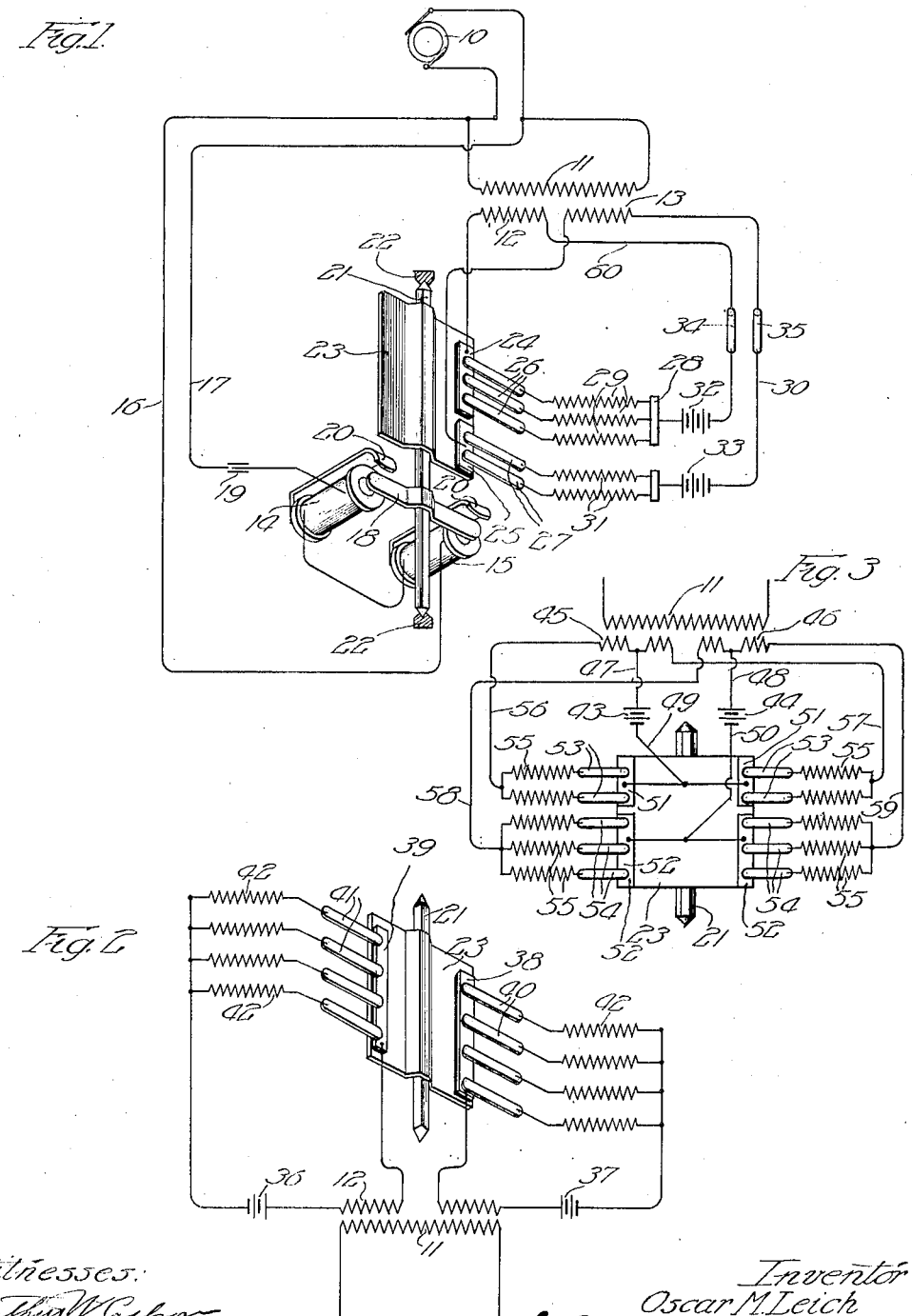

OSCAR M. LEICH, OF GENOA, ILLINOIS, ASSIGNOR TO LEICH ELECTRIC COMPANY, OF GENOA, ILLINOIS.

MULTIPLE RECTIFIER.

1,324,743.   Specification of Letters Patent.   Patented Dec. 9, 1919.

Application filed October 31, 1918. Serial No. 260,425.

*To all whom it may concern:*

Be it known that I, OSCAR M. LEICH, a citizen of the United States, residing at Genoa, in the county of Dekalb and State of Illinois, have invented a certain new and useful Improvement in Multiple Rectifiers, of which the following is a full, clear, concise, and exact description, reference being had to the accompanying drawings, forming a part of this specification.

My invention relates to multiple rectifiers, and has for its object the provision of a system embodying a multiple rectifier or rectifiers, which is more particularly an improvement over the system disclosed in my co-pending application Serial No. 139,397 filed December 28, 1916.

In my said co-pending application I show a source of alternating current supply which is utilized to operate synchronously a plurality of vibratory elements to rectify the alternating current. Each vibratory element controls a subcircuit and the amount of current furnished that subcircuit is limited. The subcircuits are then preferably connected in parallel so that a given current output may be obtained through the agency of vibratory rectifiers without over taxing the capacity of the vibratory elements themselves.

In my present application I utilize the same principle but simplify it in such a manner that a plurality of subcircuits of different characteristics may be simultaneously served. It may for instance be desirable to supply subcircuits requiring different voltages.

I will explain certain forms which my invention may take more in detail by referring to the accompanying drawings illustrating such forms, in which—

Figure 1 is a diagrammatic circuit arrangement of a system constructed and arranged in accordance with my invention.

Fig. 2 is a somewhat similar view showing a modified arrangement, and

Fig. 3 is a view similar to Fig. 2 showing a modified form of system.

Referring more particularly to Fig. 1, I show a source of alternating current 10 as connected to a primary winding 11 of a transformer.

This transformer has two secondary windings 12 and 13 respectively. A vibratory converter is provided having coils 14 and 15 connected directly by means of the conductors 16 and 17 with a source of alternating current so that the armature 18 of the rectifier operates synchronously with the reversals of the alternating current. A condenser 19 is included in the circuit.

Permanent magnets 20 are provided to polarize the rectifiers. The armature 18 is fixedly secured to a shaft 21 which shaft is rotatably mounted in bearings 22, 22 so that the shaft 21 is oscillated in accordance with the movements of the armature 18. The shaft 21 carries a flat strip 23, preferably of insulating material, which carries contact strip 24, 25.

A preferred form of vibratory rectifier is shown in my co-pending application Serial No. 235,447, filed April 24, 1918, said application showing in detail the structure of the rectifier as shown more or less diagrammatic herein. A plurality of sets of contact springs are provided, respectively the contact springs 26 and the contact springs 27.

The contact springs 26 coöperate with the contact strip 24 and the contact springs 27 coöperate with the contact strip 25. Contact springs 26 are preferably electrically connected together through the connector 28 through the interposition however of individual resistances 29. These resistances 29 limit the current supply which may pass over a particular contact spring 26 so that the danger of burn-outs may be eliminated.

A subcircuit 60 is supplied with current from the contact springs 26, this subcircuit, however, receiving the current in parallel from all of said contact springs. Said subcircuit may therefore receive current in any desirable quantity, being limited merely by the number of said contact springs 26, while the amount of current supplied by each individual contact spring is limited to the amount compatible with safe and effective operation.

In similar manner subcircuit 30 is served by the contact spring 27, resistances 31 being again included individually with the contact springs for the purpose above outlined. The subcircuit 60 may be utilized to charge the storage battery 32, which for the purposes herein may be assumed to have normal voltage of 6 volts.

The subcircuit 30 may be utilized to charge the storage battery 33, which for the purposes herein, may be assumed to have a voltage of 4 volts. The voltage supplied by the subcircuits depends, of course, upon the voltage at the terminals of the secondary windings 12 or 13 respectively, whereas the current supply which is entirely independent of the voltage depends upon the number of contact springs 26 and 27 employed in their respective circuits.

The free terminal of the secondary winding 12 is connected to the contact strip 24 and the free terminal of the secondary winding 13 is connected to the contact strip 25. The remaining terminals of these secondary windings are respectively connected to the batteries 32 and 33.

Switches 34 and 35 are included to control the sub-circuits 60 and 30. As the armature 18 vibrates synchronously with the current reversals, the strip 23 is oscillated, thus periodically connecting the contact springs 24 and 25 with the corresponding springs 26 and 27 so that positive waves, for instance, of the alternating current are selected and supplied to the subcircuits 60 and 30.

The system thus far explained will clearly indicate the practicability of supplying several subcircuits requiring current of different characteristics with unidirectional current taken from a single alternating current source of supply. The strength of the current depends merely upon the number of the contact springs employed and the safe and continued operation of the device is brought about by the individual safe guard of each individual spring circuit.

In Fig. 2, I show a system in general similar to that outlined in Fig. 1 with the exception that two storage batteries 36 and 37 are so connected that one may receive all the positive half waves and the other receive all the negative half waves. Contact strips 38 and 39 are carried by the oscillating strip 23 at opposite extremities thereof, these contact strips coöperating respectively with contact springs 40 and 41. Resistances 42 are again employed to limit the current in the individual contact spring circuits. The system outlined in Fig. 2 causes a more balanced operation in that all of the pulsations of the alternating current are available for use.

In Fig. 3 I have shown a system simplified still further in that two separate storage baleries 43 and 44 are each included in the circuit so that each is supplied with unidirectional current translated out of all of the alternating current pulsations so that none of the half waves of the alternating current are eliminated.

In order to bring this about I associate the primary winding 11 of the transformer with two divided secondary windings, respectively, the windings 45 and 46. One terminal of the storage battery is respectively connected to the central part of these windings 45 and 46 through the agency of conductors 47 and 48 respectively. The free terminals of the storage battery 43 and 44 are respectively connected by the conductors 49 and 50 with contact strips 51 and 52. Suitable contact springs 53 coöperate with the two contact strips 51 and suitable contact springs 54 coöperate with the contact strips 52, 52.

Resistances 55 are as before included individually in the contact spring circuits to limit the current flow over the springs. The free terminals of the divided secondary winding 43 are then connected by means of conductors 56 and 57 respectively with the free terminals of the oppositely disposed contact spring circuits of the contact springs 53.

Similarly the free terminals of the divided secondary winding 46 are connected by means of conductors 58 and 59 to the oppositely disposed sets of contact springs 54. In this arrangement of Fig. 3, the storage batteries 43 and 44 are both charged at the same time, but each storage battery receiving all of the half waves without interruption. all of the halfwaves, however, so far as each battery current is concerned being of the same polarity or sign so that the current through the batteries is uni-directional in character.

The voltage of the subcircuits including the storage batteries will, of course, depend upon the voltage of the secondary windings to which they are connected and this may, of course, be regulated in any suitable manner, by cutting out terms of the secondary windings or otherwise. The amount of current supplied to the battery subcircuits depends upon the number of contact springs 53 or 54 available for that particular circuit.

The extreme facility of this arrangement will be readily apparent.

By showing the various modified forms I do not wish to be understood as implying that these are the only modifications or arrangements which may be made within the scope of my invention, but have merely sought to illustrate herein what at the present time appeared to me to be three distinct characteristics of circuit arrangements which may be desirably used in connection with my invention.

I claim as my invention the following:

1. In combination with a source of alternating current, a transformer having a primary winding and a plurality of independent secondary windings, a device operating synchronously with the said alternating current having means individual to said secondary windings to translate the alternating current therefrom into pulsating uni-directional current, a set of parallelly connected subcircuits coöperating with each of said means, and a consumption circuit associated with each set of subcircuits and served with uni-directional current.

2. In combination with a source of alternating current, a transformer having a primary winding and a plurality of independent secondary windings, a device operating synchronously with the said alternating current having means individual to said secondary windings to translate the alternating current therefrom into pulsating uni-directional current, a set of parallelly connected subcircuits coöperating with each of said means, means individual to each subcircuit for limiting the quantity of current traversing said subcircuit and a consumption circuit associated with each set of subcircuits and served with uni-directional current.

3. In combination with a source of alternating current, a pair of consumption circuits, a device operating simultaneously with said alternating current having means individual to each consumption circuit to translate the alternating current from said source into pulsating uni-directional current, and a set of parallelly connected subcircuits coöperating with each of said means, said consumption circuits being associated each to each with said sets of subcircuits whereby said consumption circuits are served with uni-directional current.

4. In combination with a source of alternating current, a pair of consumption circuits, a device operating simultaneously with said alternating current having means individual to each consumption circuit to translate the alternating current from said source into pulsating uni-directional current, a set of parallelly connected subcircuits coöperating with each of said means, means individual to each subcircuit for limiting the quantity of current traversing said subcircuit, said consumption circuits being associated each to each with said sets of subcircuits whereby said consumption circuits are served with uni-directional current.

5. In combination with a source of alternating current, of a transformer having a primary winding and a plurality of independent secondary windings, means whereby said secondary windings are adapted to deliver currents of unlike voltage a device operating synchronously with the said alternating current having means individual to said secondary windings to translate the alternating current therefrom into pulsating uni-directional current, a set of parallelly connected subcircuits coöperating with each of said means, means individual to each subcircuit for limiting the quantity of current traversing said subcircuit, and a consumption circuit associated with each set of subcircuits and served with uni-directional current.

6. In combination with a source of alternating current, of a transformer having a primary winding and a plurality of independent secondary windings, a device operating synchronously with the said alternating current having means individual to said secondary windings to translate the alternating current therefrom into pulsating uni-directional current by rectifying alternate half waves, a set of parallelly connected subcircuits coöperating with each of said means, and a consumption circuit associated with each set of subcircuits and served with uni-directional current.

7. In combination with a source of alternating current, of a transformer having a primary winding and a plurality of independent secondary windings, a device operating synchronously with the said alternating current having means individual to said secondary windings to translate the alternating current therefrom into pulsating uni-directional current, by rectifying alternate half waves a set of parallelly connected subcircuits coöperating with each of said means, means individual to each subcircuit for limiting the quantity of current traversing said subcircuit and a consumption circuit associated with each set of subcircuits and served with uni-directional current.

8. In combination with a source of alternating current, of a transformer having a primary winding and a plurality of independent secondary windings, means whereby said secondary windings are adapted to deliver currents of unlike voltage a device operating synchronously with the said alternating current having means individual to said secondary windings to translate the alternating current therefrom into pulsating uni-directional current, by rectifying alternate half waves a set of parallelly connected subcircuits coöperating with each of said means, means individual to each subcircuit for limiting the quantity of current traversing said subcircuit and a consumption circuit associated with each set of subcircuits and served with uni-directional current.

9. In combination with a source of alternating current, of a transformer having a primary circuit and a plurality of secondary circuits, a device operating synchronously with the said alternating current having means individual to said secondary circuits to translate the alternating current therefrom into pulsating uni-directional current by rectifying the alternate half waves, a set of parallelly connected subcircuits coöperating with each of said means, and a consumption circuit associated with each set of subcircuits and served with uni-directional current.

10. In combination with a source of alternating current, a transformer having a primary circuit and a plurality of secondary circuits, a device operating synchronously with the said alternating current having means individual to said secondary circuits to translate the alternating current therefrom into pulsating uni-directional current, a set of parallelly connected subcircuits coöperating with each of said means, and a consumption circuit associated with each set of subcircuits and served with uni-directional current.

11. In combination with a source of alternating current, of a transformer having a primary circuit and a plurality of secondary circuits, a device operating synchronously with the said alternating current having means individual to said secondary circuits to translate the alternating current therefrom into pulsating uni-directional current by rectifying the alternate half waves, a set of parallelly connected subcircuits coöperating with each of said means, means individual to each subcircuit for limiting the quantity of current traversing said subcircuit, and a consumption circuit associated with each set of subcircuits and served with uni-directional current.

12. In combination with a source of alternating current, a transformer having a primary circuit and a plurality of secondary circuits, a device operating synchronously with the said alternating current having means individual to said secondary circuits to translate the alternating current therefrom into pulsating uni-directional current, a set of parallelly connected subcircuits coöperating with each of said means, means individual to each subcircuit for limiting the quantity of current traversing said subcircuit, and a consumption circuit associated with each set of subcircuits and served with uni-directional current.

In witness whereof, I, hereunto subscribe my name this 14th day of October A. D., 1918.

OSCAR M. LEICH.